United States Patent
Kwan

(10) Patent No.: US 12,359,354 B2
(45) Date of Patent: Jul. 15, 2025

(54) KNITTING METHOD AND KNITTING DEVICE

(71) Applicant: Nameson Industrial Limited, Tai Po (HK)

(72) Inventor: Chak Yan Alex Kwan, Tai Po (HK)

(73) Assignee: Nameson Industrial Limited, Tai Po (HK)

( * ) Notice: Subject to any disclaimer, the term of this patent is extended or adjusted under 35 U.S.C. 154(b) by 128 days.

(21) Appl. No.: 18/038,941

(22) PCT Filed: Nov. 1, 2021

(86) PCT No.: PCT/CN2021/127909
§ 371 (c)(1),
(2) Date: May 25, 2023

(87) PCT Pub. No.: WO2022/111226
PCT Pub. Date: Jun. 2, 2022

(65) Prior Publication Data
US 2023/0416956 A1    Dec. 28, 2023

(30) Foreign Application Priority Data
Nov. 25, 2020 (CN) .......................... 202011341212.8

(51) Int. Cl.
*D04B 15/66* (2006.01)
*D04B 15/68* (2006.01)

(52) U.S. Cl.
CPC ........... *D04B 15/665* (2013.01); *D04B 15/68* (2013.01)

(58) Field of Classification Search
CPC ...... D04B 15/66; D04B 15/665; D04B 15/68; D04B 15/78
(Continued)

(56) References Cited

U.S. PATENT DOCUMENTS 5,511,394 A    4/1996   Shima
5,754,431 A    5/1998   Kotaki
(Continued)

FOREIGN PATENT DOCUMENTS

CN    1107912 A    9/1995
CN    101124356 A    2/2008
(Continued)

OTHER PUBLICATIONS

International Search Report from PCT International Application No. PCT/CN2021/127909, dated Jan. 26, 2022.

*Primary Examiner* — Nathan E Durham
(74) *Attorney, Agent, or Firm* — Budzyn IP Law, LLC

(57) ABSTRACT

The present disclosure relates to a knitting method and device based on a knitting pattern in which front, left-sleeve, right-sleeve and rear-shoulder pieces are integrally connected. The method includes: collecting a knitting pattern graphic or instruction; receiving pattern information sent by a data collection module to determine the knitting type, and defining the knitting start position, the knitting direction, the knitting point position and the stitching path of different knitting types; wherein, a control module controls a driving module such that a knitting needle knits in a V-shaped path, a horizontal path or a vertical path; and when the knitting needle moves to a panel border position or a reversing position, a state monitoring module sends information to the control module, and the driving module adjusts the knitting action until the knitting operation on a target knitting panel is completed.

10 Claims, 4 Drawing Sheets

(58) Field of Classification Search
USPC .......................................................... 700/141
See application file for complete search history.

(56) References Cited

U.S. PATENT DOCUMENTS

| | | | |
|---|---|---|---|
| 2009/0019895 A1 | 1/2009 | Kawasaki et al. | |
| 2016/0309822 A1 | 10/2016 | Ng et al. | |
| 2016/0309823 A1 | 10/2016 | Ng et al. | |
| 2018/0130112 A1* | 5/2018 | Gerson | G06Q 30/0643 |

FOREIGN PATENT DOCUMENTS

| | | |
|---|---|---|
| CN | 106066898 A | 11/2016 |
| CN | 111639990 A | 9/2020 |
| CN | 214193630 U | 9/2021 |
| JP | 4723107 A | 6/1972 |
| JP | H06235148 A | 8/1994 |
| JP | 2913266 B2 | 6/1999 |
| JP | 2006219790 A | 8/2006 |
| JP | 4366321 B2 | 11/2009 |
| JP | 2011006820 A | 1/2011 |

* cited by examiner

KNITTING METHOD AND KNITTING DEVICE

CROSS-REFERENCE TO RELATED APPLICATIONS

This Application is a National Stage Application under 35 U. S.C. § 371 of PCT Application No. PCT/CN2021/127909, filed Nov. 1, 2021, which claims priority to Chinese Patent Application No. 202011341212.8, filed Nov. 25, 2020, the entire contents of which are incorporated by reference herein.

FIELD

Embodiments of the disclosure relate to apparel design technologies, and more particularly relate to a knitting method and a knitting apparatus.

BACKGROUND

Knitwear is crafted by knitting, with needles, yarn of various materials and types into intermeshed loops, i.e., a garment knitted with needles. Knitting mainly includes hand knitting and machine knitting. Knitwear on the market is mainly machine-knitted. Machine-knitting enables mass production of knitwear with lower costs.

Conventional machine-knitted knitwear is mainly manufactured by knitting, on a knitter, yarn into a plurality of individual panels including sleeve panels, front panel, and back panel, and then stitching the panels together with needles; knitwear manufactured with such conventional methods has more seams and involves a complex knitting process, where joining of poorly matched panels easily happens, resulting in a higher defect ratio. Moreover, during the knitting process, a segment of panel is always reserved as seam allowance so as to ensure seaming security and prevent thread running. Presence of excessive seams increases the amount of wool or yarn consumed for a piece of knitwear and thus increases its cost. In addition, the excessive seams make it hard to create a continuous picture or design, which restricts intarsia designing of knitwear.

SUMMARY

In view of the above, a knitting method and a knitting apparatus are needed, to offer a low production cost and a high yield and facilitates intarsia designing, so as to overcome technical problems, at the same time, it is also required to overcome high production cost, restricted intarsia design, and high defect ratio caused by complex techniques.

A knitting method is provided, the knitting method employs a system comprising:
- a data acquisition module configured to recognize an image or an instruction set out on a knitwear pattern;
- a control module configured to store knitwear pattern data and control a knitting course of needles;
- a drive module connected to the control module, the drive module being configured to drive the needles to act under control of the control module; and
- a status monitoring module configured to acquire a current operating status of the needles and feed status data back to the control module;
- wherein the knitwear pattern employed comprises a one-piece that connects the front panel with a left sleeve and a right sleeve which are joined with two side edges of the front panel, respectively, as well as a back panel joined with the left sleeve and the right sleeve that corresponds to the front panel, and a neckband joined with the front panel, the left sleeve, the right sleeve, and the back panel, respectively; wherein a knitwear piece knitted is of a one-piece structure;
- wherein the knitting method comprises:
- acquiring, by the data acquisition module, the image or instruction set out on the knitwear pattern to give knitwear pattern information;
- receiving, by the control module, the knitwear pattern information sent from the data acquisition module, determining a knitting style based on the knitwear pattern information, defining a position of casting-on, direction of knitting, positions of stitch marking points, and course of stitching under the knitting style, and encoding each stitch marking point specified on the knitwear pattern;
- sending, by the control module, the instruction to the drive module to drive the needles to follow a V-shaped course to work a serpentine knitwear pattern or follow a horizontal or vertical course to work a cross-shaped knitwear pattern;
- sending, by the status monitoring module, action information to the control module when the needles travel to a contour boundary position of a target knitwear piece or a knitting course direction transition position, such that the control module controls the drive module to adjust action of the needles till the target knitwear piece is completely knitted.

In some embodiments, the knitting style refers to open-vest cardigan knitting or pullover sweater knitting, wherein yarn is knitted following the V-shaped course for the open-vest cardigan knitting, and yarn is knitted following a horizontal or vertical course for the pullover sweater knitting.

In some embodiments, such as in procedure S2, coding information of each stitch marking point comprises coordinate parameters of the stitch marking point and deflection angle of the needles at the stitch marking point.

In some embodiments, position of each stitch marking point is jointly determined by parameters including knitwear pattern shape, yarn size, knit density of the target knitwear piece, and stitch pattern.

In some embodiments, the target knitwear piece completely knitted may be folded along a sleeve midline of the target knitwear piece, whereby two lines of seams are formed and linked together to thereby obtain knitwear.

The present disclosure further discloses a knitting apparatus, comprising:
- a knitwear pattern comprising a one-piece that connects the front panel with a left sleeve and a right sleeve which are joined with two side edges of the front panel, respectively, as well as a back panel joined with the left sleeve and the right sleeve and corresponding to the front panel, and a neckband joined with the front panel, the left sleeve, the right sleeve, and the back panel, respectively; wherein a knitwear piece knitted is of a one-piece structure;
- a data acquisition module configured to recognize an image or instruction set out on the knitwear pattern, the data acquisition module comprising an image acquisition component and a digital model acquisition component;
- a control module configured to receive knitwear pattern information transmitted from the data acquisition module, determine a knitting style based on the knitwear pattern information, define a position of casting-on, direction of knitting, positions of stitch marking points, and course of stitching under the knitting style, and model the stitch marking points;

needles for yarn to thread through, the needles being configured to execute an instructed knitting action, the knitting action comprises working a serpentine knitwear pattern along a V-shaped course or working a cross-shaped knitwear pattern along a horizontal or vertical course;

a drive module connected to the control module, the drive module being configured to drive the needles under action of the control module and adjusting a knitting course of the needles to knit an integral knitwear piece;

a status monitoring module configured to acquire a current operating status of the needle and feed status data back to the control module such that the control module adjusts action of the drive module based on the feedback.

In some embodiments, the knitting style refers to open-vest cardigan knitting or pullover sweater knitting, wherein yarn is knitted following the V-shaped course for the open-vest cardigan knitting, and yarn is knitted following a horizontal or vertical course for the pullover sweater knitting.

In some embodiments, modeling information of the stitch marking points comprise coordinate parameters of each stitch marking point and deflection angle of the needles at the stitch marking point.

In some embodiments, position of each stitch marking point is jointly determined by parameters including knitwear pattern shape, yarn size, knit density of the target knitwear piece, and stitch pattern.

In some embodiments, the target knitwear piece completed is folded and linked together to obtain the knitwear.

The knitting method and the knitting apparatus according to the disclosure employs a knitwear pattern of an integral construction, where the control module determines the knitting style of the knitwear pattern construction, defines knit parameters associated with the knitwear pattern, and builds a stitch-marking-point model, and then controls the drive module based on the knit parameters and the stitch-marking-point model data to drive the needles to operate along a predetermined knitting course so as to obtain a target knitwear piece consistent with the profile of the knitwear pattern; in this way, after the target knitwear piece is folded, seams are only formed between the left sleeve and the front/rear hems of the knitwear body and between the right sleeve and the front/rear hems of the knitwear body, which reduces the number of seams, whereby the knitwear manufacturing complexity is reduced and the yield is effectively improved because issues such as poor match of the panels linked together are prevented as much as possible; due to reduction of seams to two, waste of yarn at the seams is also reduced, whereby the production cost of knitwear is reduced; the seams occur at the bottom of left and right sleeve bodies, facilitating intarsia designing across multiple positions on the knitwear, whereby intarsia region on the knitwear is expanded, which facilitates enhancement of product competitively.

DETAILED DESCRIPTION

To make the objectives, features, and advantages of the disclosure more apparent and easily understood, embodiments of the disclosure will be described in detail with reference to the accompanying drawings. In the description below, many details are explained for sufficient understanding of the disclosure. However, the present disclosure may be implemented in many other manners different from what are described herein, and those skilled in the art may make similar modifications without departing from the concept of the disclosure; therefore, the disclosure is not limited to the specific implementations described below.

Figure 4:
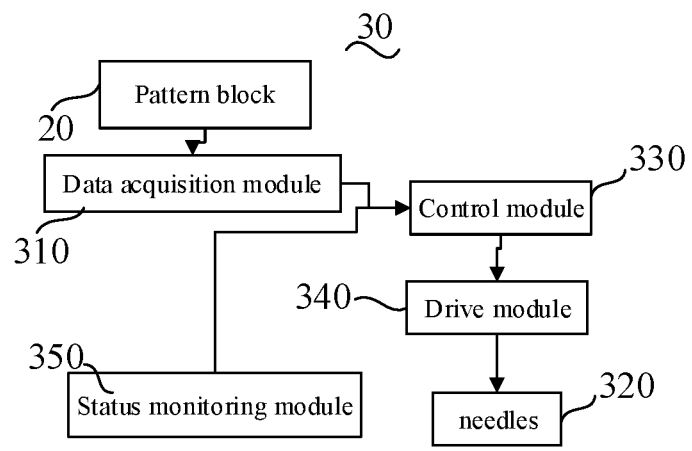
FIG. 4 is a structural schematic diagram of a knitting apparatus in an embodiment of the disclosure.

The disclosure provides a knitting method 10 which offers a low production cost and a high yield and facilitates intarsia designing. FIG. 4 illustrates a system employed by the knitting method 10, the system comprising: a data acquisition module 310 configured to recognize images or instructions set out on a knitwear pattern 20; a control module 330 configured to store knitwear pattern data and control a knitting course of needles 320; a drive module 340 connected to the control module 330 and configured to activate the needles 320 to act under control of the control module 330; and a status monitoring module 350 configured to obtain a current operating status of the needles 320 and feed status data back to the control module 330. It is noted that "panel" referred to herein may also be understood as a target knitwear piece, and in alternative embodiments, the panel and the target knitwear piece both refer to a knitted piece.

Figure 2:
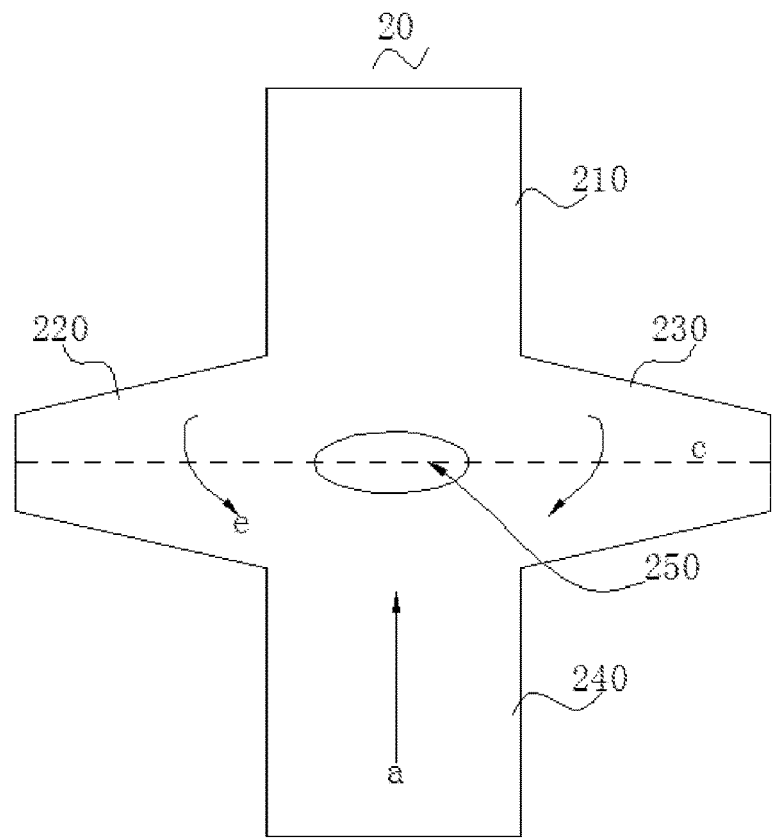
FIG. 2 is a structural schematic diagram of a knitwear pattern in an embodiment of the disclosure.
Figure 3:
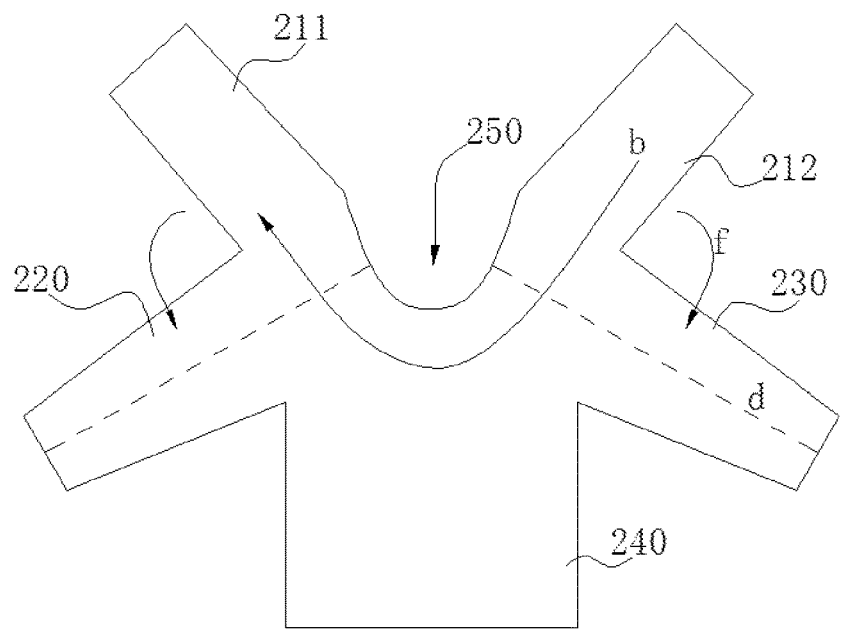
FIG. 3 is a structural schematic diagram of a knitwear pattern in another embodiment of the disclosure.

Referring to FIG. 2 and FIG. 3, the knitwear pattern 20 adopted by the knitting method 10 according to the disclosure comprises a one-piece that connects the front panel 210 with a left sleeve 220 and a right sleeve 230 which are joined with two side edges of the front panel 210, respectively, as well as a back panel 240 joined with the left sleeve 220 and the right sleeve 230 and corresponding to the front panel 240, and a neckband 250 joined with the front panel 210, the left sleeve 220, the right sleeve 230, and the back panel 240, respectively; the front panel 120 is of a one-piece structure or comprises a first piece 211 joined with the left sleeve 220 and a second piece 212 joined with the right sleeve 230. When the front panel 210 on the knitwear pattern is of a one-piece structure, the knitwear sewed and linked together is a sweater; when the front panel 210 on the knitwear pattern is of a split structure comprising a first piece 211 and a second piece 212, the knitwear sewed and linked together is a cardigan.

Figure 1:
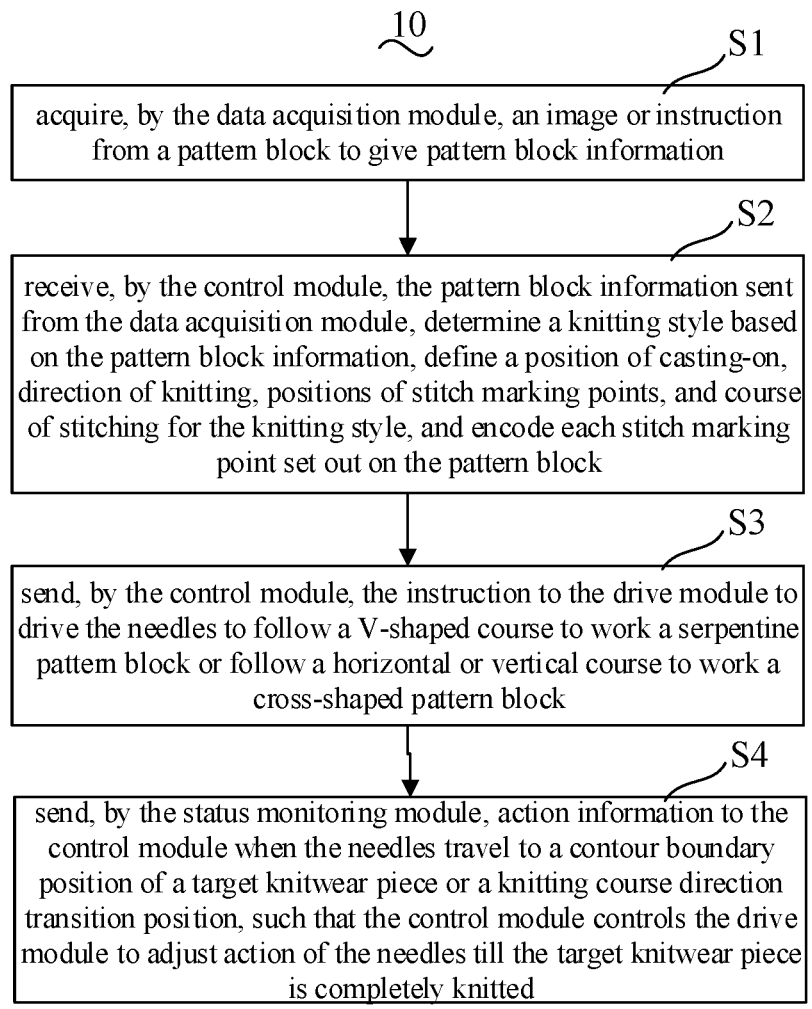
FIG. 1 is a flow diagram of a knitting method in an embodiment of the disclosure.

FIG. 1 illustrates the knitting method 10 according to the disclosure, comprising steps of:

S1) acquiring, by the data acquisition module 310, an images or an instruction set out on the knitwear pattern 20 to give knitwear pattern information.

Specifically, the data acquisition module 310 not only acquires 1:1 image information on the knitwear pattern 20 and send the image information to the control module 330, but can also acquire a digital instruction associated with the knitwear pattern 20 and send the digital instruction to the control module 330 such that the control module 330 transforms the image information or the digital instruction uniformly into a digital signal.

S2) receiving, by the control module 330, the knitwear pattern information sent from the data acquisition module 310, determining a knitting style based on the knitwear pattern information, defining position of casting-on, direction of knitting, positions of stitch marking points, and course of stitching under the knitting style, and encoding each stitch marking point set out on the knitwear pattern.

Specifically, the control module 330 checks the image information sent from the data acquisition module 310 with prestored knitwear patterns in the control module 330 to determine the knitting style, and devises a corresponding knitting course based on the knitting style. In an embodiment, the knitting style refers to a open-vest cardigan style or a pullover sweater style. FIG. 3 illustrates a knitwear pattern 20 for the open-vest cardigan style, in which case the control module 330 controls the drive module 340 to adjust the needles 320 to follow a V-shaped course to knit the yarn, and the casting-on position starts from the first piece 211 or the second piece 212 of the knitwear pattern 20 and the knitting course refers to the direction illustrated by the arrowed curve b; FIG. 2 illustrates a knitwear pattern 20 for a pullover sweater style, in which case the control module 330 controls the drive module 340 to adjust the needles 320 to follow a horizontal course or vertical course to knit the yarn, the casting-on position may start from any of the front panel 210, the left sleeve 220, the right sleeve 230, and the back panel 240, and the knitting course refers to the direction of arrowed line a in FIG. 2.

Furthermore, in step 2, coding information of each stitch marking point includes coordinate parameters of the stitch marking point 320 and deflection angle of the needles 320 at the stitch marking point, i.e., each time the needles 320 reach a stitch marking point, the drive module 340 adjusts a deflection angle of the needles 320 under action of the control module 330, for example forward knitting or backward knitting.

In an embodiment, the position of each stitch marking point is jointly determined by parameters such as knitwear pattern shape, yarn size, knit density of target knitwear piece, and stitch pattern. Given positions of the stitch marking points and deflection angle of the needles 320, the needles 320 execute the knitting action at each stitch marking point under control of the drive module 340, whereby a panel is formed.

S3) sending, by the control module 330, the instruction to the drive module 340 to drive the needles 320 to follow the V-shaped course to work a serpentine knitwear pattern or follow the horizontal or vertical course to work a cross-shaped knitwear pattern.

Specifically, referring back to FIG. 3, when the knitting style is an open-vest cardigan, the needles 320 cast on from a second piece 212 of the knitwear pattern 20, sequentially knit the right sleeve 230, the back panel 240, and the left sleeve 220, and finally knit the first piece 211, where knitting of the panels is finalized at the end of the first piece 211; or, the needles 320 may cast on from the first piece 211, and knit reversely towards the second piece 212. FIG. 2 illustrates another example in which the knitting style is a pullover sweater, where the needles 320 cast on from the front panel 210 of the knitwear pattern 20, and when coming to the parts joined with the left sleeve 220 and the right sleeve 230, the needles 320 knit back and forth between the left sleeve 220 and the right sleeve 230; after completing knitting of the left sleeve 220 and the right sleeve 230, the needles 320 continue to knit the back panel 240, and finalize knitting of the panels at the end of the back panel 240; or, the needles 320 may cast on from the back panel 240 towards the front panel 210 in a reversed order, whereby a vertical knitting course of the panels is realized. Likewise, the knitting may also start from the left sleeve 220, and after back-and-forth knitting between the front panel 210 and the back panel 240, followed by knitting the right sleeve 230; or a reversed order is exercised to knit from the right sleeve 230 towards the left sleeve 220, whereby horizontal knitting of the panels is realized.

S4) sending, by the status monitoring module 350, action information to the control module 330 when the needles 320 travel to a contour boundary position of a target knitwear piece or a knitting course direction transition position, such that the control module 330 controls the drive module 340 to adjust action of the needles 320 till the target knitwear piece is completely knitted.

It is understood that the status monitoring module 350 is configured to monitor a knitting process of the needles 320 and alarm the control module 330 when the needles 320 reach the contour boundary position of the knitwear pattern 20 such that the control module 330 controls the drive module 340 to adjust knit parameters of the needles 320, or upon end of the knitting action, feed the knitting status of the needles 320 back to the control module 330 such that the control module 330 controls the drive module 340 to stop output, i.e., stopping the knitting action of the needles 320.

It is noted that the target knitwear piece completely knitted may be folded along the sleeve midline of the target knitwear piece, whereby two lines of seams are formed and linked together to thereby obtain the knitwear. In actual production, the target knitwear piece may be folded manually with seams formed, and then the seams are manually linked together with a stitching mechanism; or, the target knitwear piece is folded by a robot arm externally connected to or built on the knitting apparatus 30, the robot arm being controlled by the control module 330, and meanwhile, the stitching mechanism, as part of the knitting apparatus 30, is controlled and invoked by the control module 330, whereby automatic production of the knitwear is realized.

Figure 5:
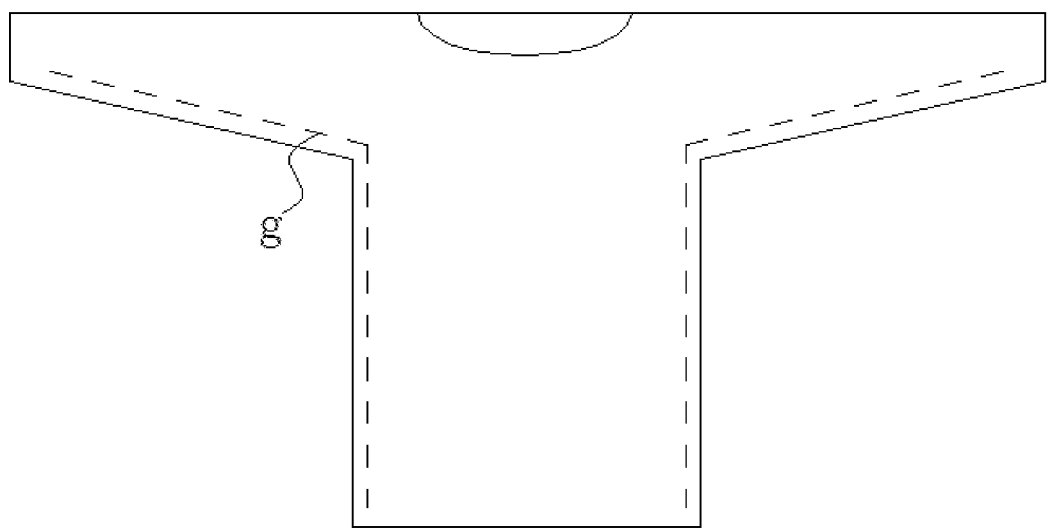
FIG. 5 is a structural schematic diagram of knitwear in an embodiment of the disclosure.
Figure 6:
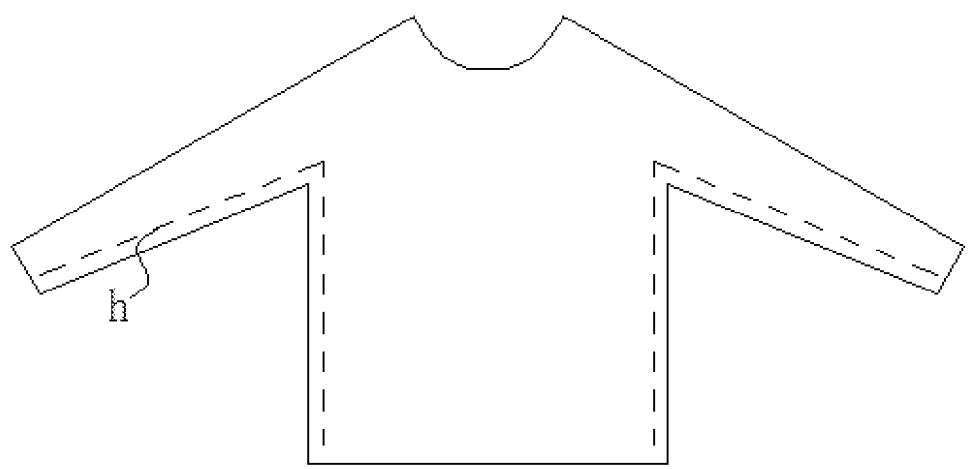
FIG. 6 is a structural schematic diagram of knitwear in another embodiment of the disclosure.

During folding of the target knitwear piece, the sleeve midline of the target knitwear piece needs to be defined. The sleeve midline refers to the connecting line between the midline of the left sleeve 220 and the midline of the right sleeve 230 on the knitwear pattern 20. Dependent on different knitting styles, the connecting line between the midlines for cardigan knitting may refer to the dotted line d and the folding direction thereof refers to the arrowed curve f in FIG. 3; and the connecting line between the midlines for sweater knitting may refer to the dotted line c, and the folding direction thereof refers to the arrowed curve e in FIG. 2. Afterwards, the target knitwear piece is folded along the position and direction of the sleeve midline, such that a line of seam is formed at the joint between the left sleeve and the lower hem of the target knitwear piece and at the joint between the right sleeve and the lower hem of the target knitwear piece, respectively, and then the seams are linked together, whereby a piece of knitwear illustrated in FIG. 5 or FIG. 6 is obtained, in which the seam g illustrated in FIG. 5 and the seam h illustrated in FIG. 6 are the seams referred to in this embodiment.

The disclosure further discloses a knitting apparatus 30, the knitting apparatus 30 comprises a paper pattern 20, a data acquisition module 310, a control module 330, needles 320, a drive module 340, and a status monitoring module 350, in which the knitwear pattern 20 comprises a one-piece that connects the front panel 210 with a left sleeve 220 and a right sleeve 230 which are joined with two side edges of the front panel 210, respectively, as well as a back panel 240 joined with the left sleeve 220 and the right sleeve 230 and corresponding to the front panel 240, and a neckband 250 joined with the front panel 210, the left sleeve 220, the right sleeve 230, and the back panel 240, respectively; the front panel 120 is of a one-piece structure or comprises a first piece 211 joined with the left sleeve 220 and a second piece 212 joined with the right sleeve 230. When the front panel 210 on the knitwear pattern is of a one-piece structure, the knitwear linked together is a pullover sweater; when the front panel 210 on the knitwear pattern is of a split structure comprising a first piece 211 and a second piece 212, the knitwear linked together is an open-vest cardigan.

The data acquisition module 310 is configured to recognize an image or an instruction on the knitwear pattern 20, comprising an image acquisition component and a digital model acquisition component. In an embodiment, the data acquisition module 310 acquires image content of the knitwear pattern 20 via software or acquires the instruction on the knitwear pattern 20 via a drawing plugin. For example, the data acquisition module 310 may comprise input software having a drawing plugin, the input software being configurable to acquire the knitwear pattern 20; for example, a tablet computer with an image drawing functionality may be loaded to the control module 330 such that with input of a drawing instruction, the image or instruction on the knitwear pattern 20 may be transmitted to the control module 330, and an operator may execute the next procedure based on the inputted image or instruction set out on the knitwear pattern 20.

The control module 330 is configured to receive the knitwear pattern information transmitted from the data acquisition module, determine a knitting style based on the knitwear pattern information, defining a position of casting-on, direction of knitting, positions of stitch marking points, and course of stitching under the knitting style, and modeling the stitch marking points on the knitwear pattern.

In an embodiment, an information transform plugin is prebuilt in the control module 330, the information transform plugin being configurable to transform the received image information or digital information on the knitwear pattern 20 into digital coordinate information, respectively, so as to model the stitch marking points associated with the knitwear pattern 20.

In an embodiment, the knitting style refers to an open-vest cardigan knitting or a pullover sweater knitting, wherein yarn is knitted following the V-shaped course for the open-vest cardigan knitting, and yarn is knitted following a horizontal or vertical course for the pullover sweater knitting. Specifically, when the yarn is knitted following the V-shaped course, the needles cast on from the first piece 211 or the second piece 212 of the knitwear pattern 20, where the knitting course refers to the direction of the arrowed curve b in FIG. 3; when the yarn is knitted following the horizontal or vertical course, the needles may cast on from any of the front panel 210, the left sleeve 220, the right sleeve 230, and the back sleeve 240, where the knitting course refers to the direction of the arrowed curve a in FIG. 2.

Furthermore, in an embodiment, the modeling information of stitch marking points include coordinate parameters of each stitch marking point and deflection angle of the needles 320. That is, each time the needles 320 travel to the position of a stitch marking point, the driving module 340 adjusts the deflection angle of the needles 320 under action of the control module 330, e.g., forward knitting or reverse knitting. The position of each stitch marking point is jointly determined by parameters including knitwear pattern shape, yarn size, knit density of target knitwear piece, and stitch pattern. Given positions of stitch marking points and deflection angle of the needles 320, the needles 320 execute the knitting action at each stitch marking point under control of the drive module 340, whereby a panel is formed.

The needles 320 are configured for yarn to thread through and for executing instructed knitting actions. The knitting actions comprise following a V-shaped course to work a serpentine knitwear pattern or following a horizontal or vertical course to work a cross-shaped knitwear pattern. It is noted that the knitting apparatus 30 according to this embodiment further comprises a knit carriage for placing finalized panels and providing an operating platform for knitting operations; of course, the knitting apparatus 30 further comprises a case for receiving the modules and protectively encapsulating the modules.

The drive module 340 connected to the control module 330 is configured to drive the needles 320 under control of the control module 330 and adjust the knitting course of the needles 320 to knit an integral piece, i.e., a target knitwear piece. In an embodiment, the drive module 340 comprises a dual-bed sliding rail, such that the control module 330 may control the dual-bed sliding rail to adjust position of the needles 320. Of course, other drive devices may also be employed to replace the drive module 340 in this embodiment, which will not be detailed here.

The status monitoring module 350 is configured to obtain a current operating status of the needles 320 and feed status data back to the control module 330 such that the control module 330 adjusts action of the drive module 340 based on the feedback. In an embodiment, the status monitoring module 350 may send an alarm to the control module 330 when the needles reach a contour boundary position of the knitwear pattern 20 during the knitting process of the needles 320 such that the control module 330 controls the drive module 340 to adjust knit parameters of the needles 320, whereby error actions of the needles 320 are corrected; in addition, the status monitoring module 350 may also feed the knitting status of the needles 320 back to the control module 330 upon end of the knitting action such that the control module 330 controls the drive module 340 to stop output, i.e., stopping the knitting action of the needles 320. It is noted that the status monitoring module 350 may monitor the needles 320 in real time or at a regular interval, e.g., transmitting the status information of the needles 320 to the control module 330 at a one-second interval, where the specific interval are dependent upon specific production conditions.

In an embodiment, after the target knitwear piece is completed, it is folded and linked together to obtain knitwear. The linking operation of the target knitwear piece may be controlled and adjusted by the control module 330 or by an external control device. The fold operation of the target knitwear piece may be performed manually to form seams or performed by a robot arm external to or built on the knitting apparatus 30, the robot arm being controlled by the control module 330, thereby realizing automatic production of knitwear.

During folding of the target knitwear piece, the sleeve midline of the target knitwear piece needs to be defined, which refers to the connecting line between the midline of the left sleeve 220 and the midline of the right sleeve 230 on the knitwear pattern 20. Dependent on different knitting styles, the connecting line between the midlines for cardigan knitting may refer to the dotted line d, and the folding direction thereof refers to the arrowed curve f in FIG. 3; and the connecting line between the midlines for sweater knitting may refer to the dotted line c, and the folding direction thereof refers to the arrowed curve e in FIG. 2. Afterwards, the target knitwear piece is folded along the position and direction of the sleeve midline, such that a line of seam is formed at the joint between the left sleeve and the lower hem of the target knitwear piece and at the joint between the right sleeve and the lower hem of the target knitwear piece, respectively, and then the seams are linked together, whereby a piece of knitwear illustrated in FIG. 5 or FIG. 6 is obtained, in which the seam g illustrated in FIG. 5 and the seam h illustrated in FIG. 6 are the seams referred to in this embodiment.

The knitting method 10 and the knitting apparatus 30 according to the disclosure employs a knitwear pattern 20 of an integral construction, where the control module 330 determines the knitting style of the knitwear pattern construction, defines knit parameters associated with the knitwear pattern 20, and builds a knitting-point model; and then, the drive module 340 is controlled based on the knit parameters and stitch-marking-point model data to drive the needles 320 to operate along a predetermined knitting course so as to obtain a target knitwear piece consistent with the profile of the knitwear pattern 20; in this way, after the target knitwear piece is folded, seams are only formed between the left sleeve and the front/rear hems of the knitwear body and between the right sleeve and the front/rear hems of the knitwear body, which reduces the number of seams to two, whereby the knitwear manufacturing complexity is reduced and the yield is effectively improved because issues such as mismatching of sewed panels are prevented as much as possible; due to reduction of seams, waste of yarn at the seams is also reduced, whereby the production cost of knitwear is reduced; the seams occur at the bottom of left and right sleeve bodies, facilitating intarsia designing across multiple positions on the knitwear, whereby the intarsia region on the knitwear is expanded, which facilitates enhancement of product competitively.

The technical features in the embodiments above may be combined arbitrarily. For the sake of conciseness, the disclosure does not describe all possible combinations of the technical features in the embodiments; however, so long as no contradiction arises in such combinations of technical features, they shall be deemed as falling within the scope of disclosure of the specification.

The embodiments described above are only part of the embodiments of the disclosure; despite their specifically and details, they should not be construed as limiting to the scope of the disclosure. It is noted that to those of normal skill in the art, various alterations and modifications may be made thereto without departing from the idea of the disclosure, and all of such alterations and modifications fall within the protection scope of the disclosure. Therefore, the protection scope of the disclosure shall be limited by the appended claims.

I claim:

1. A knitting method, characterized in that a knitting system employed by the knitting method:
    a data acquisition module configured to recognize an image or an instruction set out on a knitwear pattern;
    a control module configured to store knitwear pattern data and control a knitting course of needles;
    a drive module connected to the control module, the drive module being configured to drive the needles to act under control of the control module; and
    a status monitoring module configured to acquire a current operating status of the needles and feed status data back to the control module;
        wherein the one-piece knitwear pattern employed comprises a one-piece that connects the front panel with a left sleeve and a right sleeve which are joined with two side edges of the front panel, respectively, as well as a back panel joined with the left sleeve and the right sleeve and corresponding to the front panel, and a neckband joined with the front panel, the left sleeve, the right sleeve, and the back panel, respectively; wherein a knitwear piece knitted is of a one-piece structure;
    the knitting method comprises:
    acquiring, by the data acquisition module, the image or instruction set out on the knitwear pattern to give knitwear pattern information;
    receiving, by the control module, the knitwear pattern information sent from the data acquisition module, determining a knitting style based on the knitwear pattern information, defining a position of casting-on, direction of knitting, positions of stitch marking points, and course of stitching under the knitting style, and encoding each stitch marking point specified on the knitwear pattern;
    sending, by the control module, the instruction to the drive module to drive the needles to follow a V-shaped course to work a serpentine knitwear pattern or follow a horizontal or vertical course to work a cross-shaped knitwear pattern;
    sending, by the status monitoring module, action information to the control module when the needles travel to a contour boundary position of a target knitwear piece or to a knitting course direction transition position, such that the control module controls the drive module to adjust action of the needles till the target knitwear piece is completely knitted.

2. The knitting method according to claim 1, characterized in that the knitting style refers to cardigan knitting or sweater knitting, wherein yarn is knitted following the V-shaped course for the open-vest cardigan knitting, and yarn is knitted following a horizontal or vertical course for the pullover sweater knitting.

3. The knitting method according to claim 1, characterized in that coding information of each stitch marking point comprises coordinate parameters of the stitch marking point and deflection angle of the needles at the stitch marking point.

4. The knitting method according to claim 1, characterized in that position of each stitch marking point is jointly determined by parameters including knitwear pattern shape, yarn size, knit density of the target knitwear piece, and stitch pattern.

5. The knitting method according to claim 1, characterized in that the target knitwear piece completely knitted is folded along a sleeve midline of the target knitwear piece, whereby two lines of seams are formed and linked together to thereby obtain knitwear.

6. A knitting apparatus, characterized by comprising:
    a one-piece knitwear pattern comprising a front panel, a left sleeve and a right sleeve which are joined with two side edges of the front panel, respectively, a back panel joined with the left sleeve and the right sleeve and corresponding to the front panel, and a neckband joined with the front panel, the left sleeve, the right sleeve, and the back panel, respectively, wherein a knitwear piece knitted is of a one-piece structure;

a data acquisition module configured to recognize an image or an instruction set out on the knitwear pattern, the data acquisition module comprising an image acquisition component and a digital model acquisition component;

a control module configured to receive knitwear pattern information transmitted from the data acquisition module, determine a knitting style based on the knitwear pattern information, define a position of casting-on, direction of knitting, positions of stitch marking points, and course of stitching under the knitting style, and model the stitch marking points;

needles for yarn to thread through, the needles being configured to execute an instructed knitting action, the knitting action comprises working a serpentine knitwear pattern along a V-shaped course or working a cross-shaped knitwear pattern along a horizontal or vertical course;

a drive module connected to the control module, the drive module being configured to drive the needles under action of the control module and adjusting a knitting course of the needles to knit an integral knitwear piece;

a status monitoring module configured to acquire a current operating status of the needles and feed status data back to the control module such that the control module adjusts action of the drive module based on the feedback.

7. The knitting apparatus according to claim 6, characterized in that the knitting style refers to open-vest cardigan knitting or pullover sweater knitting, wherein yarn is knitted following the V-shaped course for the open-vest cardigan knitting, and yarn is knitted following a horizontal or vertical course for the pullover sweater knitting.

8. The knitting apparatus according to claim 6, characterized in that modeling information of the stitch marking points comprise coordinate parameters of each stitch marking point and deflection angle of the needles at the stitch marking point.

9. The knitting apparatus according to claim 6, characterized in that position of each stitch marking point is jointly determined by parameters including knitwear pattern shape, yarn size, knit density of the target knitwear piece, and stitch pattern.

10. The knitting apparatus according to claim 6, characterized in that the target knitwear piece completed is folded and linked together to obtain knitwear.

* * * * *